United States Patent
Zhang et al.

(10) Patent No.: US 10,110,922 B2
(45) Date of Patent: Oct. 23, 2018

(54) METHOD OF ERROR-RESILIENT ILLUMINATION COMPENSATION FOR THREE-DIMENSIONAL VIDEO CODING

(71) Applicant: HFI INNOVATION INC., Zhubei, Hsinchu County (TW)

(72) Inventors: Kai Zhang, Beijing (CN); Yi-Wen Chen, Taichung (TW); Jicheng An, Beijing (CN); Jian-Liang Lin, Su'ao Township, Yilan County (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 271 days.

(21) Appl. No.: 14/762,508

(22) PCT Filed: Apr. 3, 2014

(86) PCT No.: PCT/CN2014/074747
§ 371 (c)(1),
(2) Date: Jul. 22, 2015

(87) PCT Pub. No.: WO2014/166354
PCT Pub. Date: Oct. 16, 2014

(65) Prior Publication Data
US 2016/0021393 A1    Jan. 21, 2016

(51) Int. Cl.
*H04N 7/12* (2006.01)
*H04N 19/597* (2014.01)
(Continued)

(52) U.S. Cl.
CPC .......... *H04N 19/597* (2014.11); *H04N 13/10* (2018.05); *H04N 19/105* (2014.11); *H04N 19/50* (2014.11); *H04N 19/503* (2014.11)

(58) Field of Classification Search
CPC ... H04N 19/105; H04N 19/503; H04N 19/597
(Continued)

(56) References Cited

U.S. PATENT DOCUMENTS

| 8,634,475 B2 | 1/2014 | Jeon et al. | |
| 2014/0184740 A1* | 7/2014 | Zhang | H04N 19/597 348/43 |

(Continued)

FOREIGN PATENT DOCUMENTS

KR   10959538   5/2010

OTHER PUBLICATIONS

Zhang, K., et al.; "3D-CE5.h related Removal of parsing dependency for illumination compensation;" Joint Collaborative Team on 3D Video Coding Extension Development of ITU-T SG 16 WP 3 and ISO/IEC JTC 1/SC 29/WG 11; Apr. 2013; pp. 1-4.
(Continued)

*Primary Examiner* — Farzana Hossain
(74) *Attorney, Agent, or Firm* — McClure, Qualey & Rodack, LLP

(57) ABSTRACT

A method of illumination compensation for three-dimensional or multi-view encoding and decoding. The method incorporates an illumination compensation flag only if the illumination compensation is enabled and the current coding unit is processed by one 2N×2N prediction unit. The illumination compensation is applied to the current coding unit according to the illumination compensation flag. The illumination compensation flag is incorporated when the current coding unit is coded in Merge mode without checking whether a current reference picture is an inter-view reference picture.

9 Claims, 3 Drawing Sheets

Collocated reference picture

Current picture

(51) Int. Cl.
*H04N 13/10* (2018.01)
*H04N 19/105* (2014.01)
*H04N 19/50* (2014.01)
*H04N 19/503* (2014.01)

(58) Field of Classification Search
USPC .................................................. 375/240.12
See application file for complete search history.

(56) References Cited

U.S. PATENT DOCUMENTS

2015/0326881 A1\* 11/2015 Ikai ...................... H04N 19/117
375/240.12
2015/0350642 A1\* 12/2015 Park ...................... H04N 19/105
375/240.12

OTHER PUBLICATIONS

Tech, G., et al.; "3D-HEVC Test Model 3;" Joint Collaborative Team on 3D Video Coding Extension Development of ITU-T SG 16 WP 3 and ISO/IEC JTC 1/SC 29/WG 11; Jan. 2013; pp. 1-52.
Park, M.W., et al.; "3D-CE4 Results on Simplification of Residual Prediction;" Joint Collaborative Team on 3D Video Coding Extension Development of ITU-T SG 16 WP 3 and ISO/IEC JTC 1/SC 29/WG 11; Nov. 2013; pp. 1-4.
Tech, G., et al.; "3D-HEVC Test Model 2;" Joint Collaborative Team on 3D Video Coding Extension Development of ITU-T SG 16 WP 3 and ISO/IEC JTC 1/SC 29/WG 11; Oct. 2012; pp. 1-118.

\* cited by examiner

Collocated reference picture          Current picture

Correct parsing

Incorrect parsing

METHOD OF ERROR-RESILIENT ILLUMINATION COMPENSATION FOR THREE-DIMENSIONAL VIDEO CODING

CROSS REFERENCE TO RELATED APPLICATIONS

The present invention is National Phase Application of PCT Application No. PCT/CN2014/074747, filed Apr. 3, 2014, which claims priority PCT Patent Application, Serial No. PCT/CN2013/074136, filed on Apr. 12, 2013, entitled "Removal of Parsing Dependency for Illumination Compensation". The PCT Patent Applications are hereby incorporated by reference in their entireties.

TECHNICAL FIELD

The present invention relates to video coding. In particular, the present invention relates to illumination compensation in three-dimensional/multi-view video coding.

BACKGROUND

Three-dimensional (3D) television has been a technology trend in recent years that is targeted to bring viewers sensational viewing experience. Multi-view video is a technique to capture and render 3D video. The multi-view video is typically created by capturing a scene using multiple cameras simultaneously, where the multiple cameras are properly located so that each camera captures the scene from one viewpoint. The multi-view video with a large number of video sequences associated with the views represents a massive amount data. Accordingly, the multi-view video will require a large storage space to store and/or a high bandwidth to transmit. Therefore, multi-view video coding techniques have been developed in the field to reduce the required storage space and the transmission bandwidth. A straightforward approach may simply apply conventional video coding techniques to each single-view video sequence independently and disregard any correlation among different views. Such straightforward techniques would result in poor coding performance.

In order to improve multi-view video coding efficiency, multi-view video coding always exploits inter-view redundancy. The disparity between two views is caused by the locations and angles of the two respective cameras. Since all cameras capture the same scene from different viewpoints, multi-view video data contains a large amount of inter-view redundancy. To exploit the inter-view redundancy, coding tools utilizing disparity vector (DV) have been developed for 3D-HEVC (High Efficiency Video Coding) and 3D-AVC (Advanced Video Coding). For example, DV is used as a temporal inter-view motion vector candidate (TIVC) in advanced motion vector prediction (AMVP) and Merge modes. DV is also used as a disparity inter-view motion vector candidate (DIVC) in AMVP and Merge modes. Furthermore, DV is used for inter-view residual prediction (IVRP) and view synthesis prediction (VSP).

Furthermore, Illumination Compensation (IC) is a technique to reduce the intensity differences between views caused by the different light fields of two views captured by different cameras at different locations. In HTM, a linear IC model is disclosed by Liu et al. ("3D-CE2.h: Results of Illumination Compensation for Inter-View Prediction", Joint Collaborative Team on 3D Video Coding Extension Development of ITU-T SG 16 WP 3 and ISO/IEC JTC 1/SC 29/WG 11, 2nd Meeting: Shanghai, CN, 13-19 Oct. 2012, Document: JCT3V-B0045) to compensate the illumination discrepancy between different views. Parameters in IC model are estimated for each Prediction Unit (PU) using available nearest reconstructed neighbouring pixels. Therefore, there is no need to transmit the IC parameters to the decoder. Whether to apply IC or not is decided at the coding unit (CU) level, and an IC flag is coded to indicate whether IC is enabled at the CU level. The flag is present only for the CUs that are coded using inter-view prediction. If IC is enabled for a CU and a PU within the CU is coded by temporal prediction (i.e., Inter prediction), the PU block is inferred to have IC disabled. The linear IC model used in inter-view prediction is shown in eqn. (1):

$$p(i,j)=a_{IC} \cdot r(i+dv_x, j+dv_y)+b_{IC} \text{ where } (i,j) \in PU_c \quad (1)$$

where $PU_c$ is the current PU, $(i, j)$ is the pixel coordinate in $PU_c$, $(dv_x, dv_y)$ is the disparity vector of $PU_c$, $p(i, j)$ is the prediction of $PU_c$, $r(\cdot,\cdot)$ is the reference picture of PU from a neighboring view, and aIC and bIC are parameters of the linear IC model.

Moreover, in order to provide adaptive IC in the slice-level, the encoder can decide whether the IC should be applied to a current picture and transmit the decision to decoder. A one-bit flag can be encoded in the slice header of the first slice to indicate whether IC is enabled for the first slice and its subsequent slices in the picture. An example of decision process for IC decision is shown as follows.

1) Form pixel intensity histograms of the current picture and the inter-view reference original picture.
2) Calculate SAD between the two histograms.
3) If the SAD is over a threshold, the enable IC flag is set to 1;
4) Otherwise, the IC enable flag is set to 0.

The pixel intensity distributions of the current and inter-view reference pictures are represented by histograms for each colour and the similarity of two distributions are measured by Sum of Absolute Differences (SAD) of the two histograms. The SAD is then compared with a threshold to determine whether to enable IC for the current picture. The threshold may be determined based on picture characteristics collected from underlying pictures or test pictures. When the IC is disabled for a picture, the encoder has no need to determine whether to apply illumination compensation to the CUs in the current picture. No CU-level flags need to be transmitted to the decoder in this case. Accordingly, unnecessary IC decision can be avoided in both the encoder and decoder sides.

While IC can provide significant coding gain, it may cause a parsing dependency issue according to the current HEVC-based Test Model (HTM). According to the existing HTM, ic_flag is only signalled for inter CUs, where inter-view prediction is used. The parser has to check whether inter-view reference data is used. If inter-view reference data is used, the parser will parse ic_flag for the current CU. Accordingly, ic_flag should always be parsed if the reference list contains only the inter-view reference pictures. On the other hand, it should never be parsed if the reference list contains only the inter-time reference pictures. There is no parsing dependency under these two situations.

The parsing problem may arise when the reference list contains both inter-view and inter-time (i.e., temporal) reference pictures. If all PUs in the current CU are coded in non-Merge mode (e.g., Advanced Motion vector Prediction (AMVP) mode), there is no parsing dependency since all the reference pictures used are explicitly signalled by reference indices for the non-Merge mode. However, according to the existing HTM, the reference picture used for a PU coded using Merge mode is not explicitly signalled. Instead, the reference index is derived from the selected merging candidate. Due to the pruning process in merging candidate list construction, the derived reference picture may depend on Motion Vectors (MV) in its neighbouring blocks. Since MVs in neighbouring blocks may come from a collocated picture, the derived reference picture may depend on the collocated picture indirectly. If the collocated picture is damaged (e.g., due to transmission error), a parsing problem for ic_flag may occur.

FIGS. 1A and 1B illustrate an example of parsing issue arising due to indirect parsing dependency. In this example, reference picture Ref 0 and reference picture Ref 1 are inter-time and inter-view reference pictures respectively. The current CU is coded in 2N×2N Merge mode and the selected Merge candidate is indicated by Merge index 1. The reference indices associated with the first three candidates are 0, 0, and 1 in this example. The MVs derived from the first two candidates denoted as MVa and MVb are equal in this example, i.e., MVa=MVb as shown in FIG. 1A. In addition, MVb is obtained by Temporal Motion Vector Prediction (TMVP) from the collocated picture. In the merging candidate pruning process, the second possible candidate is removed from the candidate list since it is equal to the first one. This process will result in a candidate list 110 in FIG. 1B. Therefore, Merge index 1 refers to the third original candidate (before the second candidate is removed) with an inter-view reference. As a result, ic_flag should be parsed for this CU if the collocated picture is corrected received at the decoder. However, if the collocated picture is damaged (e.g., due to transmission error), the candidate associated with the neighboring block MVb may be decoded incorrectly. This will cause MVa !=MVb and the second candidate will not be removed from the candidate list in this case. This will result in candidate list 120 as shown in FIG. 1B. Therefore, Merge index 1 will refer to the second possible candidate in this candidate list, which is an inter-time reference. Consequently, ic_flag will not be parsed for this CU according to the existing HTM and a parsing problem occurs.

Accordingly, it is desirable to develop error-resilient illumination compensation, where corresponding syntax parsing is more robust to errors. Furthermore, it is desirable that such error-resilient illumination compensation will not cause any noticeable impact on the system performance.

SUMMARY

A method of error-resilient illumination compensation for three-dimensional and multi-view encoding and decoding is disclosed. The present invention removes the indirect parsing dependency to enhance the error resilience for illumination compensation. Embodiments of the present invention incorporates an illumination compensation flag for the current coding unit only if the illumination compensation is enabled and the current coding unit is processed by one 2N×2N prediction unit. The illumination compensation flag is not incorporated for the current coding unit if the current coding unit is processed by multiple prediction units with other sizes. The illumination compensation is applied to the current coding unit according to the illumination compensation flag. If a reference list for the current coding unit contains only inter-view reference pictures, the illumination compensation flag for the current coding unit is always incorporated in the bitstream when the illumination compensation is enabled. If the reference list for the current coding unit contains only inter-time reference pictures, the illumination compensation is disabled for the current coding unit.

If the illumination compensation flag for the current coding unit incorporated in the bitstream corresponds to a case that the current coding unit is coded by one 2N×2N prediction unit, the illumination compensation is disabled for the case that the current coding unit is processed by multiple prediction units with other sizes in the non-Merge mode. If the illumination compensation flag for the current coding unit incorporated in the bitstream corresponds to the case that the current coding unit is coded by one 2N×2N prediction unit, the illumination compensation flag for the case that the current coding unit is processed by one prediction unit in Merge mode is derived from a selected merging candidate. To allow the illumination compensation flag of the selected merging candidate corresponding to a temporal merging candidate to be used by the merged coding unit, the illumination compensation flags of a collocated picture referred by the temporal merging candidate are stored as other motion information. If the illumination compensation flags of the collocated picture referred by the temporal merging candidate are not available, the illumination compensation will not applied to the prediction unit in the Merge mode.

In another embodiment of the invention, a current coding unit is encoded in Merge mode or non-Merge mode, and if the current coding unit is coded in Merge mode, the illumination compensation flag is incorporated in a bitstream for the current coding unit without checking a current reference picture. If the current coding unit is coded in non-Merge mode, the illumination compensation flag is incorporated in the bitstream for the current coding unit only if the current reference picture is an inter-view reference picture. The corresponding decoder always parses an illumination compensation flag for a current coding unit when the current coding unit is coded in Merge mode.

DETAILED DESCRIPTION

Figure 1A:
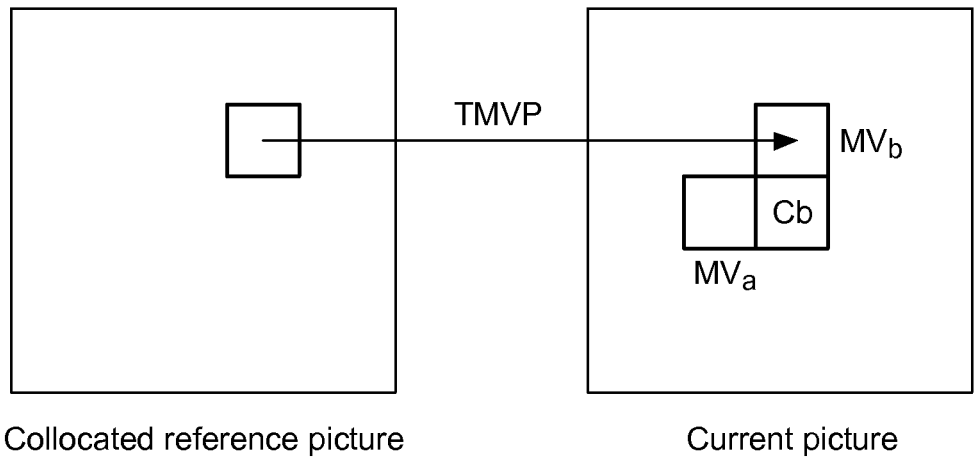
FIGS. 1A-1B illustrate an example of parsing issue where the candidate index incorrectly points to an inter-time reference picture instead of an inter-view reference picture due to an error in the candidate list.
Figure 1B:
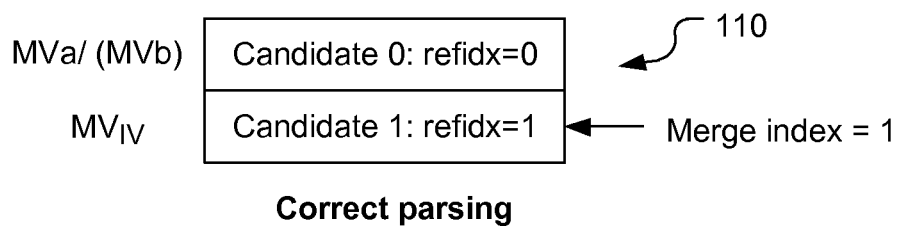
Figure 1B:
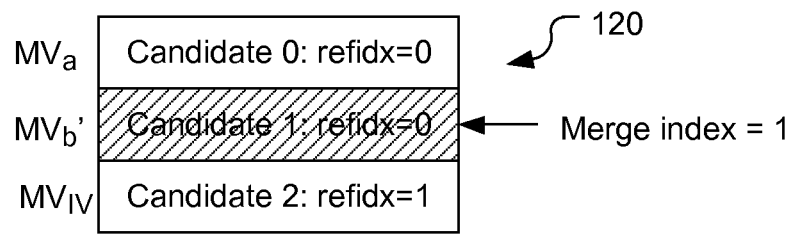

As mentioned before, a parsing issue associated with Illumination Compensation (IC) may arise according to the existing 3D coding. The parsing issue arises due to indirect parsing dependency. When an error occurs that causes an erroneous merging candidate in the candidate list, it may cause syntax parsing error associated with illumination compensation. Accordingly, the present invention overcomes the syntax parsing issue by removing the indirect parsing dependency associated with illumination compensation.

According to the present invention, for a slice with both inter-view, inter-time, or both inter-view and inter-time reference pictures in the reference list, and IC is enabled at the slice level, one embodiment of the present invention incorporates two modifications as follows.

1. ic_flag is signaled only for a CU with a 2N×2N PU. In other words, the case corresponds to a CU is processed as a single prediction unit without any further partition. For a CU corresponding to multiple PUs with other sizes (e.g., 2N×N, N×2N and N×N), IC is disabled.

2. For a CU with a PU in Merge mode, ic_flag is derived from the selected merging candidate in a similar way as other motion information.

According to the above embodiment, the parsing dependency is removed completely since ic_flag is never signalled for a CU with PUs coded in Merge mode.

In order to facilitate the above embodiment, ic_flag in the collocated picture has to be stored as other motion information since ic_flag may have to be derived from a temporal merging candidate. Furthermore, ic_flag in the collocated picture may be stored in a compression form.

If ic_flag in the collocated picture is not stored, IC will be turned off for a CU with a PU merged from a temporal merging candidate since ic_flag cannot be shared from a temporal merging candidate.

When IC is allowed in a coded slice or coded picture, the following approaches can also be applied to all CUs within the coded slice or picture to remove the parsing dependency caused by IC.

1. If the reference list contains both inter-view and inter-time reference pictures, ic_flag is only signalled for the inter CU with one or more PUs coded in non-Merge mode. For the inter CU with all PUs coded in Merge mode, IC is turned off.

2. If the reference list contains both inter-view and inter-time reference pictures, ic_flag is only signalled for the inter CU with one or more PUs coded in non-Merge mode. For the inter CU with all PUs coded in Merge mode, ic_flag is derived from the selected merging candidate in a similar way as other motion information.

3. ic_flag is always signaled when one or more PUs in the current CU are coded in Merge mode. If the current CU is coded in non-Merge mode (AMVP mode), ic_flag is only signalled when the current reference picture is an inter-view reference picture. If the current reference picture is not an inter-view reference picture (i.e. an inter-time reference picture), ic_flag is not signalled for the current CU coded in non-Merge mode.

4. ic_flag is always signaled for all CUs. However, IC only takes effect for CUs using inter-view prediction.

5. ic_flag is always signaled for all CUs and IC takes effect for CUs using inter-view prediction and CUs using inter-time prediction.

6. ic_flag is always signaled for all CUs and IC takes effect for CUs coded using inter-view, inter-time prediction or view synthesis prediction.

7. ic_flag is always signaled for all non-intra CUs. However, IC only takes effect for CUs coded using inter-view prediction.

8. ic_flag is always signaled for all non-intra CUs and IC takes effect for CUs using inter-view prediction and CUs using inter-time prediction.

9. ic_flag is always signaled for all non-intra CUs and IC takes effect for CUs using inter-view, inter-time prediction and view synthesis prediction.

In order to reduce bitrate associated with the overhead for transmitting the CU-level IC flags, embodiments according to the present invention may incorporate one or more of the following schemes to adaptively enable/disable IC for each slice or picture.

1. If the current picture/slice is a random access point (RAP) picture/slice, the IC flag is set to 1; otherwise the IC flag is set to 0.

2. The differences in terms of picture order count (POC) between the current picture and the reference pictures are determined. If the absolute POC differences for all reference pictures are larger than a threshold, the IC flag is set to 1; otherwise, the IC flag is set to 0.

3. The sum of absolute differences (SAD) between two intensity histograms for a color component of the current picture and the inter-view reference picture is calculated. Also, the differences in terms of picture order count (POC) between current picture and the reference pictures are determined. If the SAD is over a first threshold and the absolute POC differences for all reference pictures are larger than a second threshold, the IC flag is set to 1; otherwise, the IC flag is set to 0.

The embodiment to remove parsing dependency for IC as disclosed above can be applied to any color component of a color video system, such as the luminance and chroma components.

The performance of a three-dimensional (3D) or multi-view video coding system incorporating error-resilient illumination compensation by removing parsing dependency according to embodiments of the present invention is compared to that of a conventional system based on HTM-6.0. In Table 1, the embodiment according to the present invention incorporates an illumination compensation flag for a coding unit only if the coding unit is coded as one 2N×2N prediction unit, the illumination compensation is enabled and the reference list contains both inter-view and inter-time reference pictures. If the reference list contains only inter-view reference pictures, the illumination compensation flag is always incorporated for all coding units as the HTH 6.0 based system. If the reference list contains only inter-time reference pictures, the illumination compensation is disabled and there is no need to incorporate the illumination flag for the coding units. The performance comparison is based on different sets of test data listed in the first column. The system configuration is under the common test conditions. As shown in Table 1, there is about 0.1% BD-rate increase for view 1 and view 2 and almost no overall coding efficiency loss. In other words, the performance impact on the error-resilient illumination compensation according to the above embodiment is very minimal.

TABLE 1

| | video 0 | video 1 | video 2 | video PSNR/video bitrate | video PSNR/total bitrate | synth PSNR/total bitrate | enc time | dec time | ren time |
|---|---|---|---|---|---|---|---|---|---|
| Balloons | 0.0% | 0.1% | 0.1% | 0.1% | 0.1% | 0.0% | 97.0% | 96.5% | 99.1% |
| Kendo | 0.0% | 0.7% | 0.6% | 0.3% | 0.2% | 0.1% | 97.0% | 100.0% | 100.5% |
| Newspaper_CC | 0.0% | 0.0% | 0.1% | 0.0% | 0.0% | 0.0% | 97.5% | 96.9% | 100.5% |
| GT_Fly | 0.0% | 0.0% | 0.0% | 0.0% | 0.0% | 0.0% | 99.8% | 102.0% | 98.1% |

TABLE 1-continued

|  | video 0 | video 1 | video 2 | video PSNR/video bitrate | video PSNR/total bitrate | synth PSNR/total bitrate | enc time | dec time | ren time |
|---|---|---|---|---|---|---|---|---|---|
| Poznan_Hall2 | 0.0% | −0.3% | −0.2% | −0.1% | −0.1% | 0.0% | 96.7% | 93.0% | 100.7% |
| Poznan_Street | 0.0% | 0.4% | −0.3% | 0.0% | 0.0% | 0.0% | 98.1% | 102.2% | 99.0% |
| Undo_Dancer | 0.0% | 0.0% | 0.0% | 0.0% | 0.0% | 0.0% | 99.1% | 98.3% | 100.7% |
| 1024 × 768 | 0.0% | 0.3% | 0.3% | 0.1% | 0.1% | 0.0% | 97.2% | 97.8% | 100.0% |
| 1920 × 1088 | 0.0% | 0.0% | −0.1% | 0.0% | 0.0% | 0.0% | 98.4% | 98.9% | 99.6% |
| average | 0.0% | 0.1% | 0.1% | 0.0% | 0.0% | 0.0% | 97.9% | 98.4% | 99.8% |

In Table 2, the performance for another embodiment is compared with the HTM 6.0 based system, where the embodiment incorporates an illumination compensation flag for all non-Intra coding units. In order to reduce the bitrate associated with the illumination compensation flag for all non-Intra coding units, a picture level control is applied where the slice level illumination compensation is enabled only if the SAD is over a first threshold and all absolution POC differences are greater than a second threshold as mentioned before. As shown in Table 2, there is about 0.3% and 0.5% BD-rate increases for view 1 and view 2 respectively.

TABLE 2

|  | video 0 | video 1 | video 2 | video PSNR/video bitrate | video PSNR/total bitrate | synth PSNR/total bitrate | enc time | dec time | ren time |
|---|---|---|---|---|---|---|---|---|---|
| Balloons | 0.0% | 0.6% | 0.6% | 0.3% | 0.2% | 0.2% | 100.7% | 93.7% | 100.9% |
| Kendo | 0.0% | 1.6% | 2.1% | 0.8% | 0.6% | 0.6% | 100.7% | 100.2% | 102.6% |
| Newspaper_CC | 0.0% | 0.2% | 0.5% | 0.1% | 0.1% | 0.1% | 100.6% | 107.7% | 102.8% |
| GT_Fly | 0.0% | 0.0% | 0.0% | 0.0% | 0.0% | 0.0% | 101.2% | 99.8% | 102.1% |
| Poznan_Hall2 | 0.0% | −0.2% | 0.5% | 0.0% | 0.1% | 0.1% | 100.1% | 91.6% | 102.8% |
| Poznan_Street | 0.0% | −0.1% | 0.0% | 0.0% | 0.0% | 0.0% | 100.8% | 113.3% | 99.9% |
| Undo_Dancer | 0.0% | 0.1% | 0.0% | 0.0% | 0.0% | 0.0% | 101.1% | 99.7% | 96.9% |
| 1024 × 768 | 0.0% | 0.8% | 1.0% | 0.4% | 0.3% | 0.3% | 100.7% | 100.5% | 102.1% |
| 1920 × 1088 | 0.0% | −0.1% | 0.2% | 0.0% | 0.0% | 0.0% | 100.8% | 101.1% | 100.4% |
| average | 0.0% | 0.3% | 0.5% | 0.2% | 0.1% | 0.1% | 100.7% | 100.9% | 101.2% |

Figure 2:
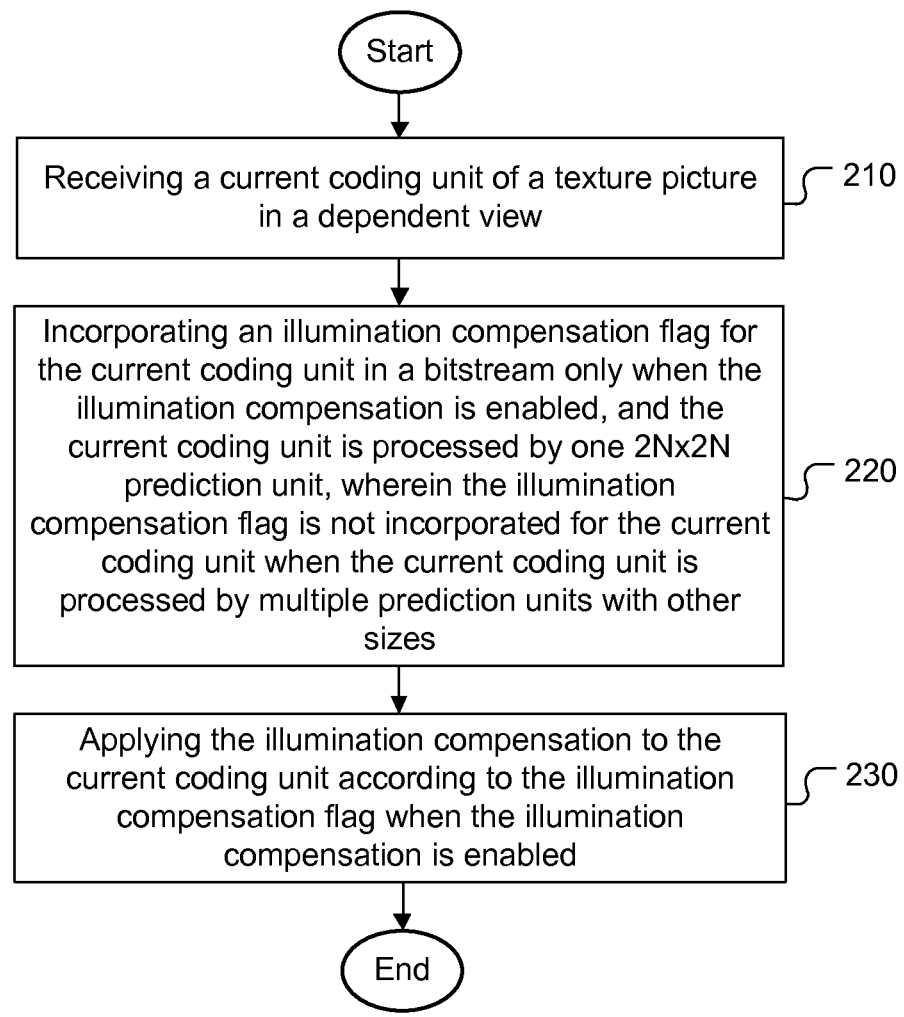
FIG. 2 illustrates an exemplary flowchart for a 3D encoding system with parsing dependency removed according to an embodiment of the present invention.

FIG. 2 illustrates an exemplary flowchart of a three-dimensional/multi-view encoding system with parsing dependency removed according to an embodiment of the present invention. The system receives a current block, for example, a current coding unit (CU) of a texture picture in a dependent view as shown in step 210. The current block may be retrieved from memory (e.g., computer memory, buffer (RAM or DRAM) or other media) or received from a processor. If a reference list for the current coding unit contains both inter-view and inter-time reference pictures, an illumination compensation flag for the current coding unit is incorporated in a bitstream only if the illumination compensation is enabled and the current coding unit is processed by one 2N×2N prediction unit as shown in step 220. The illumination compensation flag is not incorporated in the bitstream if the current coding unit is processed by multiple prediction units with other sizes. The illumination compensation is then applied to the current coding unit according to the illumination compensation flag when the illumination compensation is enabled as shown in step 230.

Figure 3:
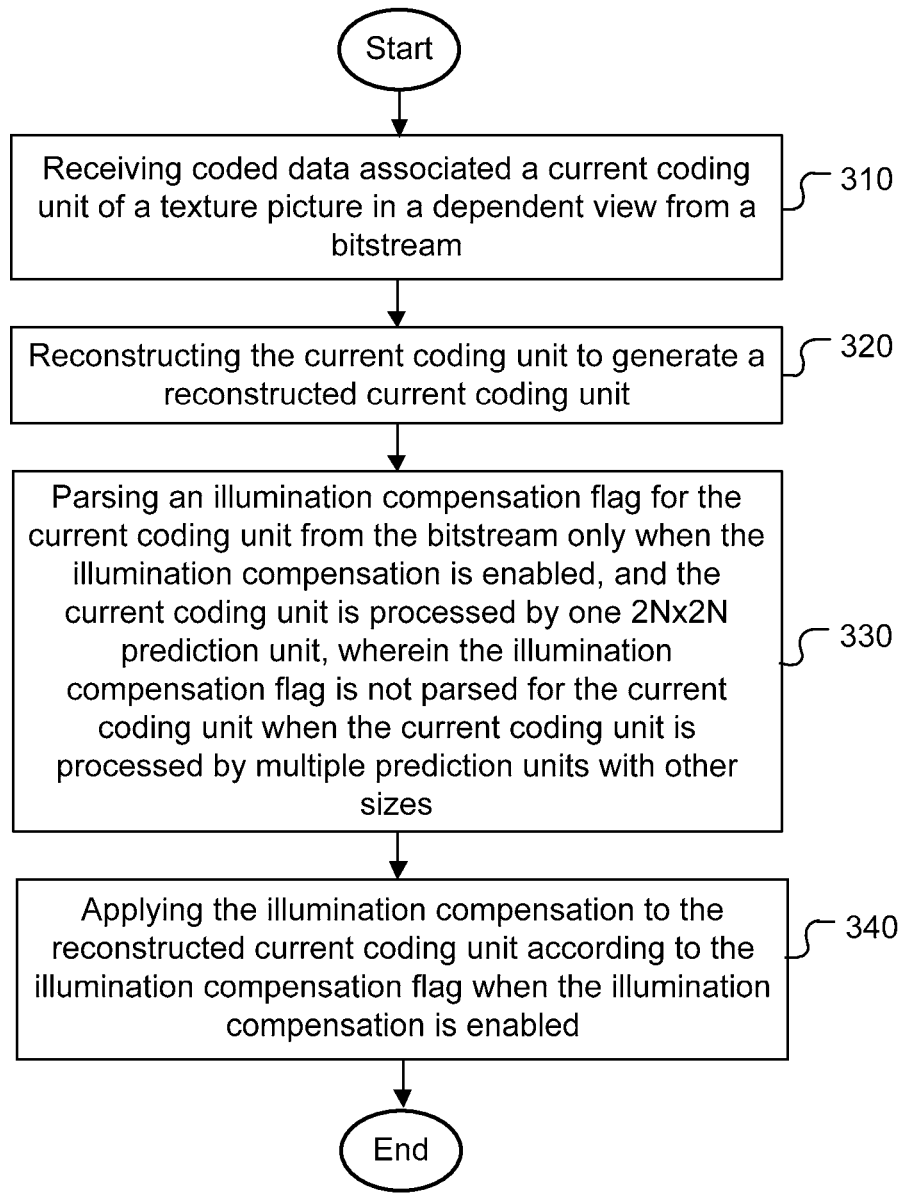
FIG. 3 illustrates an exemplary flowchart for a 3D decoding system with parsing dependency removed according to an embodiment of the present invention.

FIG. 3 illustrates an exemplary flowchart of a three-dimensional/multi-view decoding system with parsing dependency removed according to an embodiment of the present invention. The system receives coded data associated a current coding unit of a texture picture in a dependent view from a bitstream as shown in step 310. The coded data may be retrieved from memory (e.g., computer memory, buffer (RAM or DRAM) or other media) or received from a processor. The current coding unit is reconstructed to generate a reconstructed current coding unit as shown in step 320. An illumination compensation flag for the current coding unit is parsed from the bitstream only when the illumination compensation is enabled and the current coding unit is processed by one 2N×2N prediction unit as shown in step 330. The illumination compensation flag is not parsed from the bitstream when the current coding unit is processed by multiple prediction units with other sizes. The illumination compensation is applied to the reconstructed current coding unit according to the illumination compensation flag when the illumination compensation is enabled as shown in step 340.

The flowcharts shown above is intended to illustrate an example of 3D/multi-view coding with parsing dependency removed according to an embodiment of the present invention. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of illumination compensation (IC) in a three-dimensional (3D) or multi-view decoding system, the method comprising:
receiving coded data associated a current coding unit (CU) of a texture picture in a dependent view from a bitstream;
reconstructing the current coding unit to generate a reconstructed current coding unit;
parsing an illumination compensation flag for the current coding unit from the bitstream only when both the illumination compensation is enabled and the current coding unit is processed by one 2N×2N prediction unit; wherein the illumination compensation flag is not parsed for the current coding unit when the current coding unit is processed by multiple prediction units with other sizes, wherein if the illumination compensation flag incorporated in the bitstream corresponds to a case that the current coding unit is coded by said one 2N×2N prediction unit, then the illumination compensation flag for another case that the current coding unit is processed by one prediction unit in Merge mode is derived from a selected merging candidate, wherein the selected merging candidate corresponds to a temporal merging candidate, and the illumination compensation flags of a collocated picture referred by the temporal merging candidate are stored as other motion information; and
applying the illumination compensation to the reconstructed current coding unit according to the illumination compensation flag when the illumination compensation is enabled.

2. The method of claim 1 further comprising, if a reference list for the current coding unit contains only inter-view reference pictures, always parsing the illumination compensation flag for the current coding unit from the bitstream when the illumination compensation is enabled.

3. The method of claim 1 further comprising, if a reference list for the current coding unit contains only inter-time reference pictures, the illumination compensation for the current coding unit is disabled.

4. A method of illumination compensation (IC) in a three-dimensional (3D) or multi-view decoding system, the method comprising:
receiving coded data associated a current coding unit (CU) of a texture picture in a dependent view from a bitstream,
reconstructing the current coding unit to generate a reconstructed current coding unit
parsing an illumination compensation flag for the current coding unit from the bitstream only when both the illumination compensation is enabled and the current coding unit is processed by one 2N×2N prediction unit; wherein the illumination compensation flag is not parsed for the current coding unit when the current coding unit is processed by multiple prediction units with other sizes, wherein if the illumination compensation flag incorporated in the bitstream corresponds to a case that the current coding unit is coded by said one 2N×2N prediction unit, then the illumination compensation flag for another case that the current coding unit is processed by one prediction unit in Merge mode is derived from a selected merging candidate, wherein the selected merging candidate corresponds to a temporal merging candidate and the illumination compensation flags of a collocated picture referred by the temporal merging candidate are not available, the illumination compensation is not applied to said one prediction unit in the Merge mode; and
applying the illumination compensation to the reconstructed current coding unit according to the illumination compensation flag when the illumination compensation is enabled.

5. A method of illumination compensation (IC) in a three-dimensional (3D) or multi-view decoding system, the method comprising:
receiving coded data associated a current coding unit (CU) of a texture picture in a dependent view from a bitstream;
reconstructing the current coding unit to generate a reconstructed current coding unit;
always parsing an illumination compensation flag for the current coding unit from the bitstream when the current coding unit is coded in Merge mode, wherein the illumination compensation flag is only parsed for the current coding unit coded in non-Merge mode when a current reference picture is an inter-view reference picture; and
applying the illumination compensation to the reconstructed current coding unit according to the illumination compensation flag when the illumination compensation is enabled.

6. The method of claim 5, wherein the illumination compensation flag is not parsed for the current coding unit coded in non-Merge mode when the current reference picture is an inter-time reference picture.

7. A method of illumination compensation (IC) in a three-dimensional (3D) or multi-view encoding systems, the method comprising:
receiving a current coding unit of a texture picture in a dependent view;
encoding the current coding unit in Merge mode or non-Merge mode;

incorporating an illumination compensation flag for the current coding unit in a bitstream when the current coding unit is coded in Merge mode, and incorporating the illumination compensation flag for the current coding unit coded in non-Merge mode only when a current reference picture is an inter-view reference picture; and applying the illumination compensation to the current coding unit according to the illumination compensation flag when the illumination compensation is enabled.

8. The method of claim 7, wherein the illumination compensation flag is not incorporated for the current coding unit coded in non-Merge mode when the current reference picture is an inter-time reference picture.

9. A method of illumination compensation (IC) in a three-dimensional (3D) or multi-view decoding system, the method comprising:

receiving coded data associated a current coding unit (CU) of a texture picture in a dependent view from a bitstream;

reconstructing the current coding unit to generate a reconstructed current coding unit;

parsing an illumination compensation flag from the bitstream by determining whether the current coding unit is processed by one 2N×2N prediction unit, whether the current coding unit is coded in Merge mode, and whether at least one current reference picture is an inter-view reference picture, wherein the illumination compensation flag is parsed from the bitstream if the current coding unit is coded in Merge mode and the current coding unit is processed by one 2N×2N prediction unit, and the illumination compensation flag is parsed from the bitstream if the current coding unit coded in non-Merge mode and said at least one current reference picture is determined to be an inter-view reference picture; and applying the illumination compensation to the reconstructed current coding unit according to the illumination compensation flag when the illumination compensation is enabled.

* * * * *